(12) United States Patent
Wiebe et al.

(10) Patent No.: US 7,333,947 B2
(45) Date of Patent: Feb. 19, 2008

(54) NETWORK-BASED SYSTEM

(75) Inventors: Linus Wiebe, Lund (SE); Kristofer Skantze, Lund (SE)

(73) Assignee: Anoto AB, Lund (SE)

( * ) Notice: Subject to any disclaimer, the term of this patent is extended or adjusted under 35 U.S.C. 154(b) by 1155 days.

(21) Appl. No.: 09/987,159

(22) Filed: Nov. 13, 2001

(65) Prior Publication Data
US 2002/0059119 A1    May 16, 2002

Related U.S. Application Data

(60) Provisional application No. 60/257,836, filed on Dec. 21, 2000.

(30) Foreign Application Priority Data
Nov. 13, 2000    (SE)    ................................ 0004131

(51) Int. Cl.
*G06Q 40/00*    (2006.01)
(52) U.S. Cl. ........................... 705/26; 705/23; 705/27; 705/38
(58) Field of Classification Search ................ 345/179; 705/23, 26, 35, 39
See application file for complete search history.

(56) References Cited

U.S. PATENT DOCUMENTS

| | | | |
|---|---|---|---|
| 5,208,449 A | 5/1993 | Eastman et al. | |
| 5,591,949 A | 1/1997 | Bernstein | |
| 5,640,002 A | 6/1997 | Ruppert et al. | |
| 5,652,412 A * | 7/1997 | Lazzouni et al. | 178/18.01 |
| 5,852,434 A | 12/1998 | Sekendur | |
| 5,852,809 A * | 12/1998 | Abel et al. | 705/26 |
| 5,933,812 A | 8/1999 | Meyer et al. | |
| 5,969,712 A * | 10/1999 | Morita et al. | 345/179 |
| 6,016,956 A | 1/2000 | Takami et al. | |

(Continued)

FOREIGN PATENT DOCUMENTS

EP    0 485 996 B1    4/1996

(Continued)

OTHER PUBLICATIONS

Hoshi et al. "A Mobile Pen-Based Computing System for Cellular Telephone Networks", IEEE, 1993, pub. No. 0-7803-0917-0/9.*

(Continued)

*Primary Examiner*—Vincent Millin
*Assistant Examiner*—Dan Kesack
(74) *Attorney, Agent, or Firm*—Birch, Stewart, Kolasch & Birch, LLP.

(57) ABSTRACT

A system for information management consists of a product, for instance a notepad sheet, which has a writing surface (3) with a position code (5), which codes a plurality of positions on the surface, and a device, which is adapted to record the information which is being written on the writing surface by detecting the position code. Moreover, on the product there are a number of activation icons (7a-g). When such an activation icon is detected by the device, the device initiates a predetermined operation which utilizes the recorded information. Such an operation can, for instance, consist of sending the recorded information to an indicated address.

A product, a device, a method and a computer program for information management are also shown.

13 Claims, 6 Drawing Sheets

U.S. PATENT DOCUMENTS

| | | | |
|---|---|---|---|
| 6,076,734 A | 6/2000 | Dougherty et al. | |
| 6,078,806 A | 6/2000 | Heinonen et al. | |
| 6,101,483 A * | 8/2000 | Petrovich et al. | 705/26 |
| 6,176,425 B1 * | 1/2001 | Harrison et al. | 235/385 |
| 6,327,395 B1 * | 12/2001 | Hecht et al. | 382/306 |
| 6,330,976 B1 * | 12/2001 | Dymetman et al. | 235/487 |
| 6,663,008 B1 | 12/2003 | Pettersson et al. | |
| 6,674,427 B1 | 1/2004 | Pettersson et al. | |
| 6,832,717 B1 * | 12/2004 | Silverbrook et al. | 235/380 |
| 2001/0053980 A1 * | 12/2001 | Suliman et al. | 705/1 |
| 2002/0023029 A1 * | 2/2002 | Denver | 705/35 |
| 2002/0166895 A1 | 11/2002 | Wiebe et al. | |
| 2003/0084002 A1 | 5/2003 | Ericson et al. | |
| 2003/0093376 A1 | 5/2003 | Silverbrook et al. | |
| 2003/0093377 A1 | 5/2003 | Silverbrook et al. | |
| 2003/0093378 A1 | 5/2003 | Silverbrook et al. | |

FOREIGN PATENT DOCUMENTS

| | | |
|---|---|---|
| EP | 1016999 A2 * | 7/2000 |
| GB | 2 306 669 A | 5/1997 |
| WO | WO 97/46986 | 12/1997 |
| WO | WO 98/20446 | 5/1998 |
| WO | WO 98/34203 | 8/1998 |
| WO | WO 99/50787 | 10/1999 |
| WO | WO 00/04477 | 1/2000 |
| WO | WO 00/13150 | 3/2000 |
| WO | WO 00/22906 | 4/2000 |
| WO | WO 00/28455 | 5/2000 |
| WO | WO 00/42581 | 7/2000 |
| WO | 00/72242 A1 | 11/2000 |
| WO | WO 00/72241 A1 | 11/2000 |
| WO | WO 01/26032 A1 | 4/2001 |
| WO | WO 01/26033 A1 | 4/2001 |
| WO | WO 01/61635 | 8/2001 |

OTHER PUBLICATIONS

"United Airlines Automates In-Flight Shopping with Mobile Handhelds Based on PenRight!" Business Wire, Nov. 30, 1998.*

* cited by examiner

NETWORK-BASED SYSTEM

This application claims priority on provisional Application No. 60/257,836 filed on Dec. 21, 2000, the entire contents of which are hereby incorporated by reference.

FIELD OF THE INVENTION

This invention relates to different aspects of a network-based system for carrying out operations concerning goods or services that are indicated on a product and more specifically to a method, a computer program, a device, a system and a product that can be used in this connection.

BACKGROUND ART

There is a trend towards increased mobility in today's society. People want, for example, to be able to communicate, retrieve information, order goods and services, and carry out various tasks regardless of where they are and independent of access to stationary devices. In order to meet this requirement, a number of portable and hand-held devices have been developed, such as portable computers, mobile telephones, PDAs and reading pens.

A further category of hand-held devices is electronic pens, using which it is possible to write and draw in the same way as with an ordinary pen, but which at the same time electronically record what is written by means of a sensor, for example a CCD or an accelerometer.

The Applicant has developed an electronic pen that is intended to be used on a surface which is provided with a position-coding pattern and which has an optical sensor which continually reads off the position-coding pattern in order to record what is written electronically in the form of coordinates. The position-coding pattern and the pen is described in e.g. WO 01/26032, which is hereby incorporated by reference. A pen of a similar type is described in U.S. Pat. No. 5,852,434.

The Applicant's pen can, among other things, be used to write messages and to send these via a mobile phone to another mobile phone or via the mobile phone and the Internet to a computer.

There is, however, a wish to be able to use an electronic pen for purposes other than recording text and sending messages.

SUMMARY OF THE INVENTION

This wish is fulfilled completely or partially by features of embodiments of the invention presented herein.

According to a first aspect, the present invention thus relates to a method enabling a person to initiate an operation in a network-based system regarding goods or services that are indicated on a product. The method comprises the step of giving an instruction to the system that the operation is to be carried out using person-specific information previously stored in the system, by reading off a position-coding pattern in an operation field on the product using a hand-held device, which operation field is provided with a position-coding pattern which codes coordinates representing said instruction in the system.

According to this method, a person can thus initiate an operation, for example make a payment, simply by reading off a position-coding pattern. No information needs to be written down or entered in any other way, no information needs to be memorized and no information needs to be sent on paper which can be copied and end up in the wrong hands. By reading off the position-coding pattern the person gives an instruction to the system that a particular operation is to be carried out and that person-specific information previously stored in the system is to be used to carry out the operation. This is the simplest possible way of carrying out an operation in a network-based system.

The operation can be carried out in a completely mobile way. All that is required is a hand-held device for reading off the position-coding pattern. The communication with other units in the network-based system can take place immediately or at a later time.

The operation concerns goods or services in a wide sense. The goods or services can already have been delivered or can be about to be delivered in the future as a result of the operation. The operation can preferably consist of a payment for the goods or services, in which case the person-specific information can be an account from which the payment is to be made. It can, however, also consist of an order for goods, for example information, in which case the person-specific information is the person's address, electronic or physical, to which the information is to be sent. It can also consist of an electronic signing of a document, in which case the person-specific information is the person's signature in digital format. A further example is subscribing to shares, which requires access to more than one type of person-specific information, for example civic registration number and address. A person skilled in the art can find further examples of operations that require access to person-specific information that is of the nature that it is not changed often but can be previously stored in the network-based system in order to be used by various parties in the system for the carrying out of operations concerning various goods and services when the person so permits.

The goods or services are indicated on the product. By this it is meant that there is information on the product so that the user can understand which goods or services are intended and what effect reading off the position-coding pattern in the operation field will have. The product can be any product on which one or more items of goods or services can be indicated and on which a position-coding pastern can be applied in such a way that it can be read off by a hand-held device which is intended for this purpose. The product is preferably a physical product and can, for example, be a sheet of paper, a brochure, a catalogue, a newspaper, a form or packaging of some suitable material. The product can advantageously be of such material that it is possible to write information with an ordinary pen point.

The position-coding pattern can be any type that codes coordinates for positions with a resolution that makes it possible to record electronically text handwritten with a normal pen point. The pattern is preferably of the type described in Applicant's international Patent Applications WO 01/26032 and WO 01/26033.

A great advantage of the use of a position-coding pattern of the type described above in comparison to some other type of code is that the position-coding pattern makes it possible also to record graphical information which is drawn by hand.

For example, the mark which is made in a payment box can be recorded and stored in the system. This makes possible later comparison with the physical mark which the user has made in the advertisement. The user can additionally choose to make the mark as a personal mark instead of just a cross or a tick.

In addition, the position-coding pattern allows the user to attach any graphical information that is not coded or specified in the system itself to another party in the system, which naturally increases the flexibility of the system considerably. The user can thus attach a more detailed specification of the operation or a message with requirements or information concerning the operation to the other party.

The position-coding pattern has thus the dual function of coding information and of making possible recording of graphical information.

In the simplest case, the reading off of the position-coding pattern can be carried out by reading off such part of the position-coding pattern that codes coordinates for a single position. In other cases, it can be necessary to read off coordinates for several positions. At the same time as the reading off, a mark can be made with a pen point on the device. This has the advantage that the person who carried out the reading off has a "receipt" or confirmation that the reading off has been carried out.

The hand-held device can be any device that is suitable for reading off a position-coding pattern. The position-coding pattern can be optically readable, or can be readable by some other physical principle, such as electromagnetic, capacitive, inductive, chemical, etc.

In a preferred embodiment, the step of giving an instruction comprises reading off the position-coding pattern by means of a hand-held device that has a unique identity with which the person-specific information is associated.

The person who uses the device and who gives instructions to the system about the carrying out of the operation does not need to enter any identification data in order for the operation to be able to be carried out using the person-specific information, as the person is identified by means of the identity of the hand-held device. This can be a serial number, that is a unique product identification or manufacturing number, or some other unique code that has been stored in the device for identification purposes. The identity is preferably stored in hardware or in some other way that makes it difficult for a user to change it.

The step of giving an instruction preferably comprises giving an instruction to make the person-specific information available to a party that needs to use it in connection with the carrying out of the operation.

By reading off the position-coding pattern in the operation field, the person thus gives permission for the person-specific information to be made available to and to be able to be used by a party that is involved in the operation. If the operation, for example, is a payment, the instruction can comprise an instruction to allow a payment recipient to have access to the person's credit card number and obtain payment from the credit card account.

If the operation is a signing of a document, the instruction can comprise an instruction to give the one requiring the signature on the document access to the person's digital signature for addition to the document.

In response to the reading off of the position-coding pattern the device thus makes the person-specific information available, e.g. by means of the unique identity, to the party that needs it.

In this way, a remotely controlled operation can be achieved using pen and paper, albeit pen and paper of a special type.

The method can further comprise the step of using the hand-held device to create and record electronically graphical information that is to be attached to the said instruction by moving the device across an information field which is provided with the position-coding pattern on the product and which is intended to receive the graphical information.

Even though an operation in its simplest form can be carried out simply by reading off the position-coding pattern in the operation field, there are operations where it can be advantageous for the person to add supplementary information of a non-recurrent type that is only relevant for the operation in question, for example, regarding the number of products that a payment concerns or in the form of a signature as confirmation of the operation. The position-coding pattern is very suitable for this, and thus the same technique can be used to instruct the system to carry out the operation and to add additional information simply and quickly. The supplementary information can, of course, also consist of simple marks in other fields or boxes on the product. These fields or boxes can, for example, specify choice of goods or services from various goods or services that are indicated on the product, or can qualify the operation, for example by specifying which method of payment is to be used.

The information field can be a separate field or can be combined with the operation field. The positions that are coded in the information field and operation field need not have a relationship that corresponds to the physical relationship on the product but instead the relationship can be a different one.

A particularly interesting operation to be able to carry out in a mobile way using a hand-held device is, as mentioned, a payment operation. In a preferred embodiment the system is therefore a payment system, the operation is a payment, the person-specific information is the person's account and the instruction is an instruction to the effect that a payment is to be made from the account.

As the person-specific information is previously stored in the system, a person can carry out a payment just by reading off a position-coding pattern, without needing to specify a long account number which the person has not normally memorized.

The method described above is of particular interest to the person when he or she can store one or more items of person-specific information in the same place in the system, from which the item or items of information can be made available to various parties connecting to the system. The person does not then need to store the information with each new party with which the person wants to carry out operations in the way described above by reading off a position-coding pattern in an operation field.

According to a second aspect of the invention, this relates to a method in a hand-held device for initiating an operation concerning goods or services indicated on a product. The method comprises the steps of receiving a position-coding pattern from the product, identifying, by means of coordinates which the position-coding pattern codes, an instruction from a person who uses the device to the effect that an operation is to be carried out using person-specific information previously stored in the system and making possible the carrying out of the operation by communication with a network-based system.

The advantages of this aspect of the invention are apparent from the above.

The hand-held device thus receives a position-coding pattern. Reception can take place by a sensor in the device recording one or more images of the position-coding pattern. Each image contains a subset of the position-coding pattern which corresponds to the field of vision of the device. By reception of the position-coding pattern is thus not meant the reception of the whole position-coding pattern, but just of a subset of this. In order to simplify the description, reference is, however, just made to the position-coding pattern.

The device itself preferably decodes the position-coding pattern and determines to what coordinates this corresponds.

Alternatively, the device can send the received position-coding pattern for decoding in some external unit. This is, however, a less preferred embodiment as it requires considerable bandwidth.

The coordinates represent the instruction given by the person who uses the device. The instruction can be identified by the device or by an external unit to which the coordinates are sent. The device may for instance store a list of coordinates and corresponding instructions. The instruction need not be explicitly identified. It suffices that the device obtains enough information from the coordinates in order for it to be able to take the steps needed for making possible the carrying-out in the network of the operation that corresponds to the instruction by the user of the device.

An important function of the device is to identify, by means of the coordinates which the position-coding pattern codes, a party that needs to utilize the person-specific information in connection with carrying out the operation. The coordinates make this possible. The device itself can contain means to make it possible to identify the party, but this would require considerable memory space in the device and would necessitate reprogramming whenever new parties are connected to the system.

In a preferred embodiment, the step of identifying the party therefore comprises sending at least some of the coordinates to a first computer and receiving in response information about a network address of the party's computer. In this way, the hand-held device obtains information about with which party it is to communicate and how the party is to be reached via the network.

The network can be any computer network, preferably the Internet.

The party can, for example, be a payment recipient or a provider of information or an intermediary of some kind.

As mentioned above, the person-specific information can be made available to the party for the operation.

In one embodiment, this can be carried out by the device creating an operation code and sending it to the party's computer and to an additional computer in the network that stores the person-specific information, so that the party can obtain access to the person-specific information from the additional computer by means of the operation code.

This makes it possible for the person-specific information to be stored at a single location in the system, namely in the additional computer which is accessible to all the possible parties that can connect to the network. The user can store it there himself. The storage can be carried out easily by the user himself. The additional computer can also be protected by other security systems than are possible for the hand-held device.

For security reasons, the operation code can be a random number or a time stamps It can alternatively be generated in accordance with predetermined rules or be retrieved from a list in the device. This is, however, less secure. The operation code can also be generated by some external unit with which the hand-held device communicates.

The person-specific information is preferably stored in association with the device's unique identity so that this can be used to obtain the person-specific information. For this purpose, the method preferably comprises the step of transmitting to the additional computer and to the party a device identity which uniquely identifies the hand-held device and with which the person-specific information is associated.

As an alternative, the person-specific information can be made available by the device retrieving it from a memory in the device and sending it to the party. The person-specific information must then be programmed into the device, preferably by the user, which means that such programming must be supported.

As a further alternative, the device should be able to retrieve the person-specific information from some external unit, for example from the additional computer, and send it to the party.

For certain operations a person can have more than one item of person-specific information that can be relevant for the carrying out of the operation. For example, if the operation is a payment, the person can have different accounts from which payments can be made. These can be stored in the additional computer where they are associated with the device's unique identity. The choice of what person-specific information is to be used can be carried out in various ways. One variant for making the person-specific information available comprises identifying the person-specific information from a plurality of items of person-specific information on the basis of the coordinates which the position-coding pattern codes.

Another variant is that the step of making the person-specific information available comprises receiving from the person a choice of the person-specific information from a plurality of items of person-specific Information.

According to a third aspect of the invention, the method described above can be realized using a computer program which is stored on a memory medium. The program can, for example, be stored in a memory in the hand-held device and executed by a computer in the hand-held device.

According to a fourth aspect or the invention, this relates to a hand-held device for initiating an operation concerning goods or services indicated on a product, comprising a sensor for recording a position-coding pattern and a signal-processing unit for implementing the method described above.

According to a fifth aspect of the invention, this relates to a system for making possible at least one operation in a network concerning goods or services indicated on a product, which operation is intended to be initiated using one hand-held device of a plurality of hand-held devices by reading off a position-coding pattern, which codes coordinates, in an operation field on the product. The system comprises a device database which stores a unique identity for each of the devices and at least one item of person-specific information, associated with each identity, for the person who is the owner of the device, so that the operation can be carried out by a party in the network using the person-specific information stored in the device database, the person-specific information being retrievable by the party by means of the device identity, which is sent to the party in response to the device reading off the position-coding pattern in the operation field on the product.

According to a sixth aspect of the invention, this relates to a product which comprises an indication concerning goods or services, and an operation field which is provided with a position-coding pattern which codes a plurality of coordinates which represent an instruction to a network-based system to carry out an operation regarding said goods or services using person-specific information previously stored in the system, which person-specific information is associated with a unique identity of a reading-off device which a person who wants to carry out the operation uses to read off the position-coding pattern.

The advantages of these aspects of the invention are apparent from the discussion above. What was said concerning the method is naturally also applicable where appropriate for the product, the system and the device.

BRIEF DESCRIPTION OF THE FIGURES

This invention will be described in greater detail in the following with reference to the accompanying drawings, in which.

DESCRIPTION OF PREFERRED EMBODIMENTS OF THE INVENTION

Figure 1:
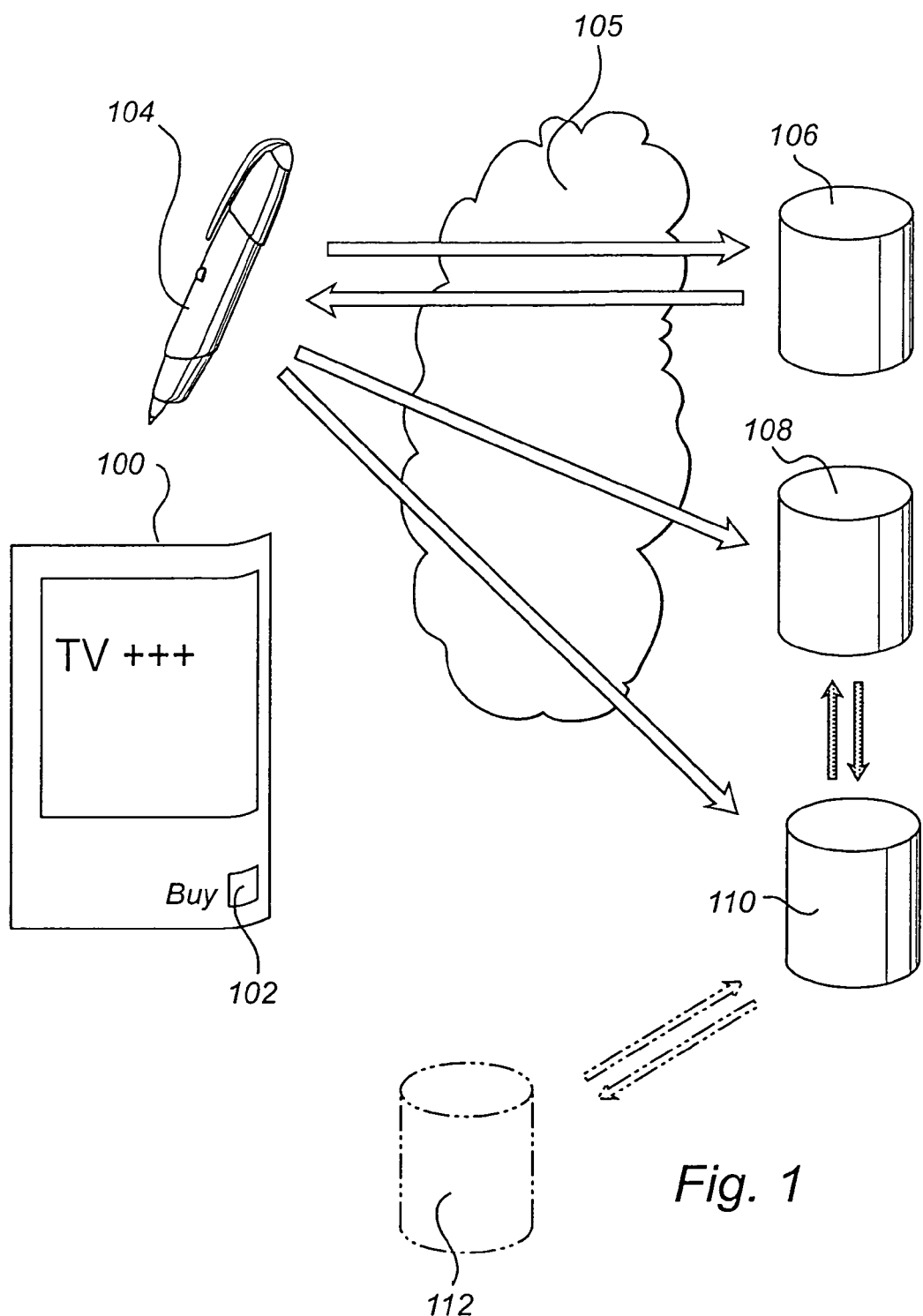
FIG. 1 shows an overview of a system according to an embodiment of the invention.

FIG. 1 shows a network-based system for carrying out of operations concerning services or goods. In order to simplify the description, it is assumed in the following that the operation to be carried out is a payment.

The system in FIG. 1 comprises a product 100 in the form of a sheet of paper, on which there is a printed advertisement for a service in the form of a subscription to a Pay-TV channel. The advertisement specifies in the normal way terms and conditions and the cost of the subscription. The advertisement further comprises an operation field 102 in the form of a payment box which is provided with a position-coding pattern. Finally the advertisement also comprises an explanation of what a tick in the payment box means.

The position-coding pattern in the operation field codes coordinates for positions on a virtual surface, which is an imaginary surface made up by all the unique points for which the position-coding pattern is able to code the coordinates. The surface is divided into a very large number of coordinate areas. The payment box is provided with a subset of the position-coding pattern that corresponds to positions within a particular coordinate area, which the advertiser has acquired the right to use.

The position-coding pattern can be the position-coding pattern that is described in the above-mentioned WO 01/26032 or any other kind position-coding pattern that codes absolute positions.

The system further comprises a hand-held device 104 in the form of an electronic pen. A unique identity number is stored in the pen which identifies the ten. The pen can communicate with computers in a network 105, for example the Internet, via integrated communication circuits or via a network connection unit (not shown), for example in the form off a mobile phone, a PDA or a computer. The network is depicted by a "cloud" in the figure.

In this embodiment, the pen 104 communicates with three computers 106, 108 and 110. The first computer 106 stores, in an address database, information about various coordinate areas on the virtual surface, for example who has the right to a particular coordinate area (below also called the owner) and which operation this coordinate area represents.

The second computer 108 stores, in a device database, the unique identity number of the electronic pens that are connected to the system. For each pen's identity number there is also stored at least one item of person-specific information, which in this case consists of an account number and name and address of the pen owner.

The third computer belongs to a party in the system who is responsible for the offer in the advertisement, who is to ensure that the service is provided and who is to receive payment for the service (below also called the advertiser).

Now assume that the company TeVe AB has bought the right to use a particular coordinate area on the virtual surface and the subset of the position-coding pattern corresponding to this, and that the company has in addition decided to use the coordinate area to make it easier for potential customers to access their Pay-TV channel. Advertisements are then printed with payment boxes 102 with the relevant subset of the position-coding pattern. In addition, the first computer 106 is informed that the coordinate area is to be used for a payment operation. In the first computer 106 information is then stored to the effect that the coordinate area in question belongs to TeVe AD, an IP address of TeVe AB's computer 110 to which the electronic pen is to send information, and information to the effect that the coordinate area in question concerns a payment operation, i.e. information concerning which instruction the coordinate area corresponds to.

Now also assume that the pen owner 104 reads the advertisement and wants to have access to the advertised Pay-TV channel. He takes his pen and makes a mark in the payment box 102 with a pen point on the device. The part of the position-coding pattern in the payment box which lies within the field of vision of the pen is continually recorded while the mark is being made, The marking means an instruction to the system to the effect that the pen owner wants to buy the service in the advertisement and gives permission for money to be taken from the account the pen owner has previously recorded in the second computer 108 as associated with the identity number of the pen 104. The service is to be provided to the address that the pen owner has also recorded previously in the second computer 108 as associated with the identity number of the pen.

When the pen 104 receives the position-coding pattern, it decodes the pattern and determines which coordinates the pattern codes. These coordinates are sent by the pen to the first computer 106, together with the identity number of the pen.

In the first computer 106, it is checked who is the owner of the coordinate area to which the received coordinates belong. In this case it is TeVe AB. The first computer 106 sends TeVe AB's address and the stored information to the effect that the operation in question is a payment to the pen, utilizing the pen's identity number to determine the pen's address, If the communication with the pen 104 is carried out via the pen owner's mobile phone, information about the owner of the coordinate area can be displayed on the mobile phone's display and confirmation from the pen owner can be required in order for the payment operation to be completed.

The confirmation can be carried out simply by pressing a button. In order to increase security and prevent frauders from using stolen pens, the confirmation can be required, for example, in the form of a PIN code or biometric data.

When the pen receives a response from the first computer 106, it creates an operation code by generating a random number. This operation code is sent together with the pen's identity number and any information to the effect that it is TeVe AB that is a party to the operation to the second computer 108 where the operation code is stored in association with the pen's identity number which is already recorded from a previous occasion. The address of the second computer can for instance be stored in the pen or obtained from the first computer.

The pen 104 also sends the operation code and its identity number to the third computer 110, which is here TcVc AB's computer, the address of which the pen received from the first computer.

When the third computer 110 receives this information from the pen, it knows that a customer wants to subscribe to the Pay-TV channel and pay for this, as this advertisement is the only one that the company is running at present. It sends the operation code and the pen's identity number to the second computer 108. The second computer checks that the operation code is the same as the one it obtained earlier from the pen 104. If this is the case, it allows TeVe AB's computer 110 to have access to the account number, name and address of the pen owner. Using this information TeVe AB can provide the service to the pen owner and can receive payment from his bank account. Communication with the pen owner's bank can take place by current methods and is therefore not described here in greater detail, but is depicted with broken lines by arrows and a can 112.

A great advantage of this system is the storage of the person-specific information in the second computer 108 from which the information can be obtained by new parties that connect to the system.

Of course, the system described above can be varied in many ways to achieve the same advantages.

For example, the operation code could be generated by the first computer 106 instead of by the pen and could be sent back to the pen. In this case, the first computer could transmit the pen's identity number, operation code and information about the owner of the payment box direct to the second computer. This would have the advantage that the pen only needs to send one message, namely the message to the owner of the payment box.

If the pen owner has several items of person-specific information of the same type stored in the second computer 108, for example several accounts, the second computer can send a query to the pen 104 regarding which item of information is to be used for the operation. The alternatives can, for example, be displayed to the pen owner on the display of his mobile phone and the selection can be made using the keypad of the phone and sent back to the second computer 108 and in addition if necessary forwarded to the third computer 110.

In an alternative embodiment, the person-specific information could be stored in the pen and sent by this straight to TeVe AB's computer 110. The second computer 108 is thus not needed, at least not for storage of the person-specific information.

The first and the second computers could also be one and the same computer. The term "computer" is to be taken here in the broad sense. It can be a network server.

Confirmation can also be requested at different stages and by different parties in the system.

Of course, various forms of encryption can also be used for the communication between the different units in the system.

Figure 2:
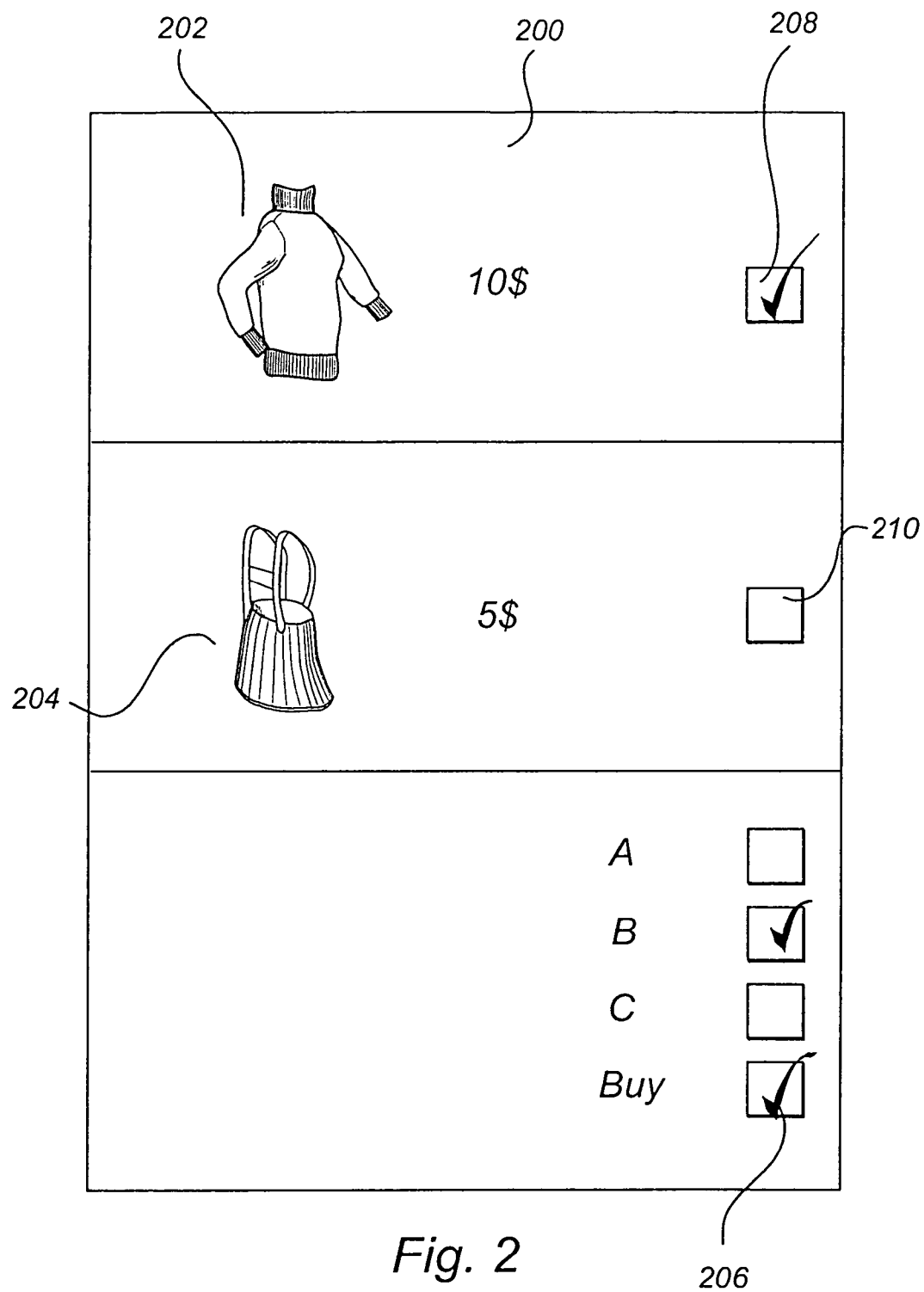
FIG. 2 shows a product according to an embodiment of the invention.

FIG. 2 shows a product 200 in the form of a page with an advertisement which offers the customer a wider choice of options. In the following, the advertisement is assumed to use the same system as that described in FIG. 1. The advertisement offers two types of goods 202 and 204, in the form of two different items of clothing. In the same way as in the advertisement in FIG. 1, there is a payment box 206 in the advertisement. There are in addition three boxes A, B, C in the advertisement which define the payment operation. For example, A, B, C can correspond to three different types of credit card. In the different boxes A, B, C there are three different subsets of the position-coding pattern. In addition, in the first computer 106 information is stored to the effect that the corresponding coordinate areas represent the three different types of credit card.

For example, if the pen owner has recorded two different credit card numbers for two different credit card companies in the second computer 108, he can choose which of these is to be used for the payment by making a mark in the corresponding box in the advertisement.

For each of the goods there is also a box 208 and 210 with a subset of the position-coding pattern. These subsets correspond to partial areas in a coordinate area to which the advertiser has acquired the right.

In this example, the boxes 208, 210 and A-C constitute information fields, in contrast to the box 20S which constitutes an operation field.

The advertiser can inform the first computer 106 what these partial areas represent so that the First computer can send an indication concerning this to the pen which forwards the indications to the advertiser.

In a preferred embodiment, however, the advertiser himself stores in his computer 110 what the partial areas represent. In this way the advertiser can reuse corresponding subsets of the position-coding pattern for different goods and services in a simple way.

Now assume that the pen owner wants to buy the uppermost item of clothing 202 in the advertisement and wants to use credit card B. He accordingly ticks the box 208 for the uppermost item of clothing, box B for credit card B and finally the payment box 206.

The pen decodes the received position-coding pattern and determines which coordinates this represents. In this case, the different subsets of the position-coding pattern code coordinates for points within different coordinate areas on the virtual surface. The pen recognizes that the coordinates from the payment box 206 and the coordinates from the credit card box B are such that are to be sent to the first computer 106. This determines that the coordinates from the payment box 208 come from an area on the virtual surface that belongs to the advertiser and concerns a payment. It further determines that the coordinates from box B concern a credit card company B. It sends back the address of the advertiser, information to the effect that the intended operation is a payment and that the payment is to be made by means of credit card B.

In the same way as in the example in FIG. 1, the pen creates an operation code and sends this to the second computer, together with the pen's identity number and an indication that credit card account B is to be used.

In addition, the operation code, the pen's identification number and information to the effect that it is credit card account B that is to be used, are sent to the advertiser. When the advertiser receives this message, the advertiser knows that a purchase is to be made, but not of what, as the advertisement contains several types of goods and as the advertiser has perhaps several types of advertisements with payment boxes.

In the advertiser's computer 110, there is stored, however, which coordinate area the advertiser has acquired. The advertiser's computer then sends a request to the pen, the address of which can be obtained, for example, from the second computer 108 or can be apparent from the message from the pen, to the effect that the pen 104 is to send all the coordinates that it has stored within the advertiser's coordinate area.

The advertiser's computer 110 then receives the coordinates that correspond to the mark in the box 208 for the uppermost item of clothing and in this way can determine what the pen owner wants to buy and pay for.

As an alternative, it is possible for the first computer 106 to inform the pen to which coordinate area the advertiser has the right and it is possible for the pen to include all the coordinates from that area in the message to the advertiser's computer straight away, so that this does not need to request the coordinate information from the pen.

The boxes 208 and 210 concerning the items of clothing can be made larger and designed so that they are suitable for containing handwritten text. Instead of making a mark in the box beside the uppermost item of clothing, the pen owner can then write by hand in the box that he wants two items of clothing in size medium and in the colour blue. This is an efficient way of letting a user specify additional information. An alternative would be to code all possible options with position-coding patterns, but this would give the advertisement an overcomplicated appearance. In addition, it is difficult to foresee all the information that a user might want to send to a party in the system.

In the case of the handwritten additional information, the advertiser's computer 110 receives the coordinates that represent the movement of the pen when the additional information was being written and can thereby recreate an image of the written information which can be interpreted using an ICR program (Intelligent Character Recognition) in the computer or by a person.

In the description of both the preceding examples, the payment box is provided with a subset of the position-coding pattern that the advertiser has acquired and the advertiser himself has decided that this subset is to be used to represent a payment operation and has informed the first computer 106 of this. As an alternative, it is possible for the payment box to contain two separate subsets of the position-coding pattern, where a first subset represents the advertiser and a second subset represents in general the operation of making a payment. In this way all the parties in the system can use the same subset to represent the payment operation and can combine this subset with a subset that is specific to the advertiser. If the advertisement contains only one item of goods or one service, in addition the advertiser can select a subset within the area of the position-coding pattern to which he has acquired the right so that this subset also makes it possible for the advertiser to identify to which advertisement out of a plurality of advertisements the message from the pen refers. In order for this to be possible, the pen must, however, in this case send the coordinates which correspond to the mark in the payment box.

Of course, the above can be generalized to apply to any operation. In addition the above "divided" boxes can contain more than two different subsets of the position-coding pattern. For example, the pattern from the three credit card boxes A-C could be incorporated into three separate payment boxes. The payment box 206 could thus be replaced by three payment boxes for payment by means of credit card A, B or C.

It has been stated above that the first computer 106 has stored information about what the coordinate areas corresponding to the subsets of the position-coding pattern in the credit card boxes A, B, C, refer to. According to another variant, the advertiser could use three partial areas within his coordinate area on the virtual surface in order to create three different payment buttons, one for each of the credit cards, A, B, C. In this case, it is the advertiser's computer that identifies which credit card is to be used, on the basis of coordinate information from the payment box.

As a further variant, the advertisement could contain a payment box that is coded in such a way that the second computer returns information about possible methods of payment to the pen, whereupon the pen owner has the ability to select the method of payment, for example via his mobile phone.

Figure 3A:
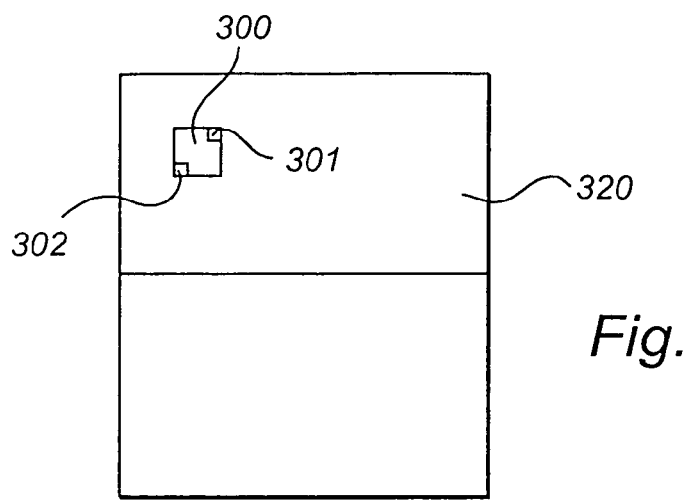
FIGS. 3a-c show examples of how the virtual surface can be arranged.

FIGS. 3*a*, *b* and *c* show examples of how different coordinate areas on the virtual surface can be used.

FIG. 3*a* shows an example that corresponds to the embodiment in FIG. 1. TeVe AB has acquired the right to the area 300 on the virtual surface. This lies within a larger region 320 of the virtual surface within which different areas can be acquired by different parties. The pens that are included in the system are programmed that when they detect coordinates within this region they are to send at least some of the coordinates to the first computer for determination of who is the owner of the area to which the coordinates belong. TeVe AB has itself specified that the sub-area 301 within the area 300 is to be used to represent a payment operation. The first computer 106 has been informed of this, and thus can return this information to the pen when it receives coordinates within the sub-area 301.

TeVe AB can also have defined that the sub-area 302 is to be used for ordering operations that use address information stored in the system.

In a corresponding way, other parties can define what other areas are to he used for. A Precondition is, of course, that the pen supports the operation defined by a party.

Figure 3B:
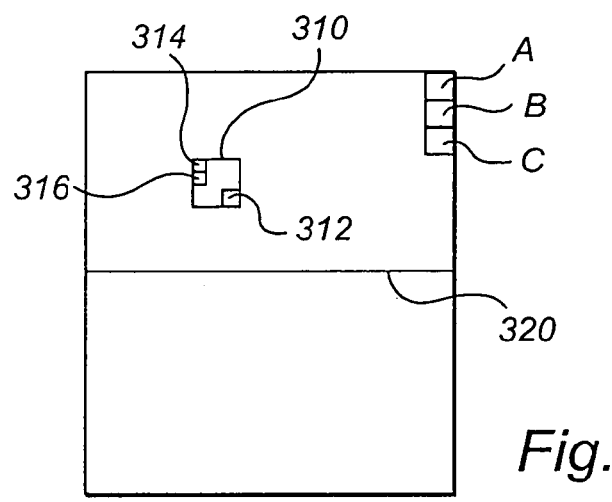

FIG. 3*b* shows an example of the layout of the virtual surface in the case corresponding to the embodiment in FIG. 2. In this case, the advertiser has acquired the right to the area 31. In the same way as in the previous example, he has defined that a sub-area 312 is to be used for payment operations and has informed the first computer of this. He has also defined different sub-areas 314, 316 for items of clothing in the advertisement in FIG. 2 and stored information in his computer himself about what these sub-areas refer to. On the virtual surface there are in addition three areas that represent the different credit card companies A-C. These sub-areas lie within the region 320 which concerns coordinates that are to be sent to the first computer 106, but the first computer is arranged for these sub-areas to return information about which credit card company is referred to and thus not a network address for these.

Figure 3C:
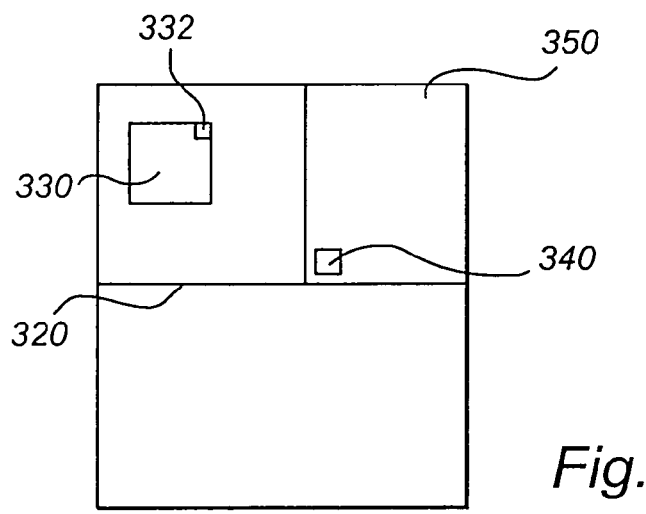

FIG. 3*c* shows the layout of the virtual surface when the above-mentioned example with "divided" boxes is used. In this case, the advertiser has acquired the right to the area 330. When he wants to create a payment box, he uses a subset of the position-coding pattern that corresponds to the sub-area 332 within the area 330 and combines this with a subset of the position-coding pattern that corresponds to an area 340 that defines in general the operation of making a payment and which therefore lies within a section 350 of the region 320 that belongs to the system administrator and for which the first computer returns to the pen an indication of which operation is referred to.

It should be emphasized that as the preferred position-coding pattern described below is used, the payment box will appear essentially identical to the user in all the cases described above.

If a divided box is used, the user must make a mark that extends through most of the box so that both the subsets of the position-coding pattern are read off.

Figure 4:
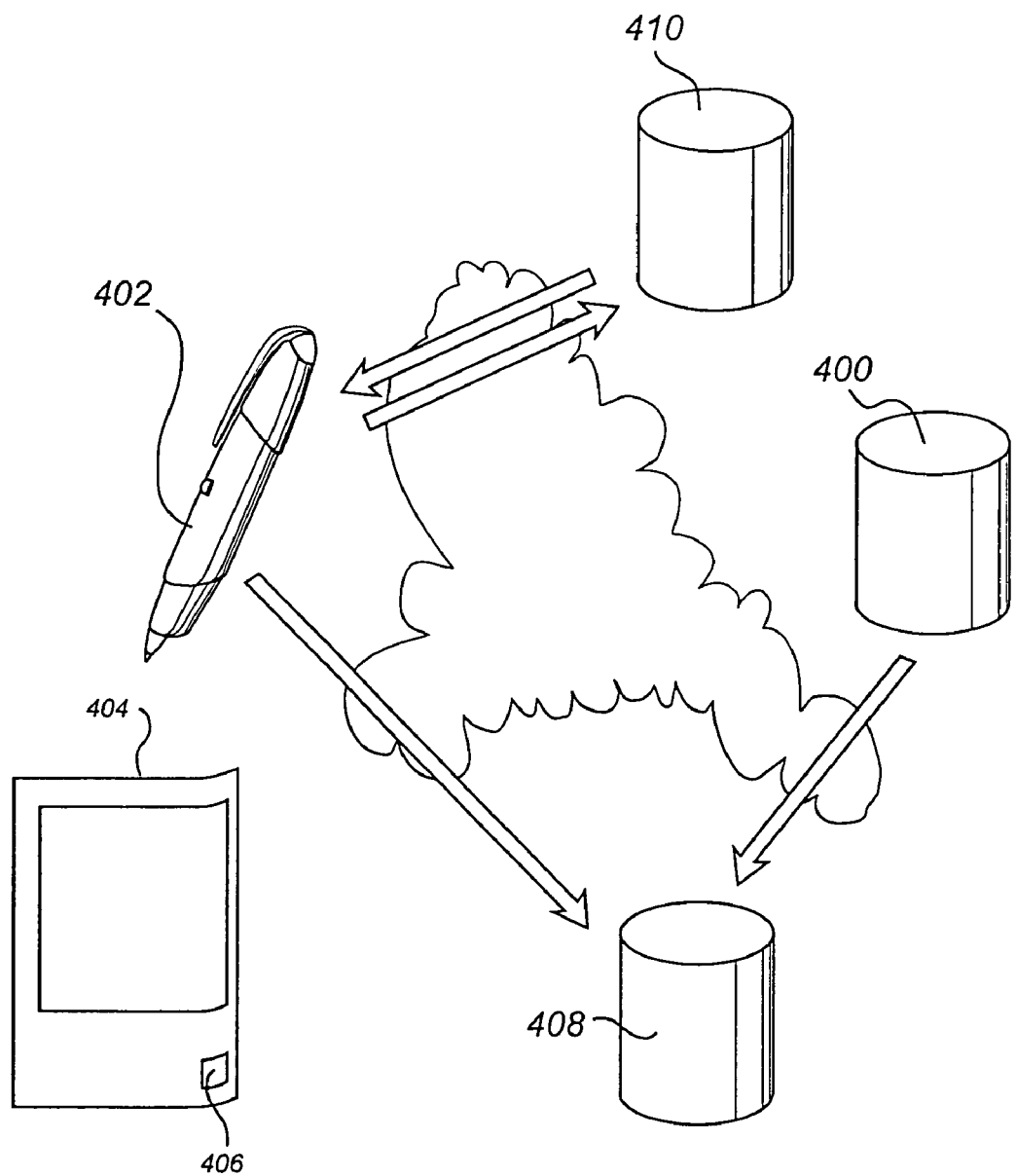
FIG. 4 shows an overview of a system according to a second embodiment of the invention.

In the following, a further example is described of a system for carrying out an operation regarding goods or services using person-specific information previously stored in the system. The system is described with reference to FIG. 4.

This system can be used to make it possible for a pen owner to pay his bills in a very simple way via, for example, a bank or postal giro account.

Assume now that company X, which is represented by its computer 400, is to invoice a customer who has an electronic pen 402. The company X creates an invoice 404 in the normal way. The invoice has a specification part which specifies services or goods that have been provided or that are going to be provided. It consists therefore of a product with an indication of goods or services.

The company X provides the invoice 404 with a payment box 406 with a subset of the position-coding pattern which corresponds to a sub-area in a coordinate area which the company X has acquired. A unique subset is used for each invoice, corresponding to a unique sub-area. The subsets can, however, be reused.

The company X also informs (arrow from 400 to 408) the giro bank's computer 408 that the invoice in question, that has a particular number, has been provided with a subset of the position-coding pattern which codes coordinates within a particular sub-area. The giro bank stores this information in a database in its computer 408.

When the pen owner wants to pay the invoice he just makes a mark in the payment box 406 with his pen. When the pen decodes the position-coding pattern which was recorded when the mark was made, the pen recognizes coordinates which are to be sent to a predetermined computer 410 (corresponding to the first computer in FIG. 1) to determine who is the owner of the coordinate area to which the coordinates belong.

The pen 402 receives back a network address of the giro bank's computer 408. It then sends its unique identity number and the decoded coordinates to the giro bank's computer 408, which identifies in its database that the coordinates refer to, for example, invoice no.

The identity numbers of the pens with which giro payments are able to be made can also be stored in the giro bank's computer 408, and associated with each of these identity numbers there is person-specific information, which in this case is the account from which the invoice sum is to be debited.

Alternatively, the giro bank's computer can make a look-up in the equivalence of the second computer 108 in FIG. 1 in order to obtain from there details of the account from which the money is to be taken. In connection with this, an operation code may need to be generated and sent to both the giro bank's computer and the second computer.

Using the information obtained in this way, the giro bank can now carry out the transfer from the pen owner's account to the account which is indicated on the invoice as the recipient of the invoice sum and which is stored in the giro bank's computer.

Of course, variants are also possible where the user adds graphical information in a corresponding way to that described in the examples above. For example, the user could fill in an amount himself in an information field. This variant can, for example, be used when there are different alternatives on the invoice, such as payment for one or more products.

Figure 5:
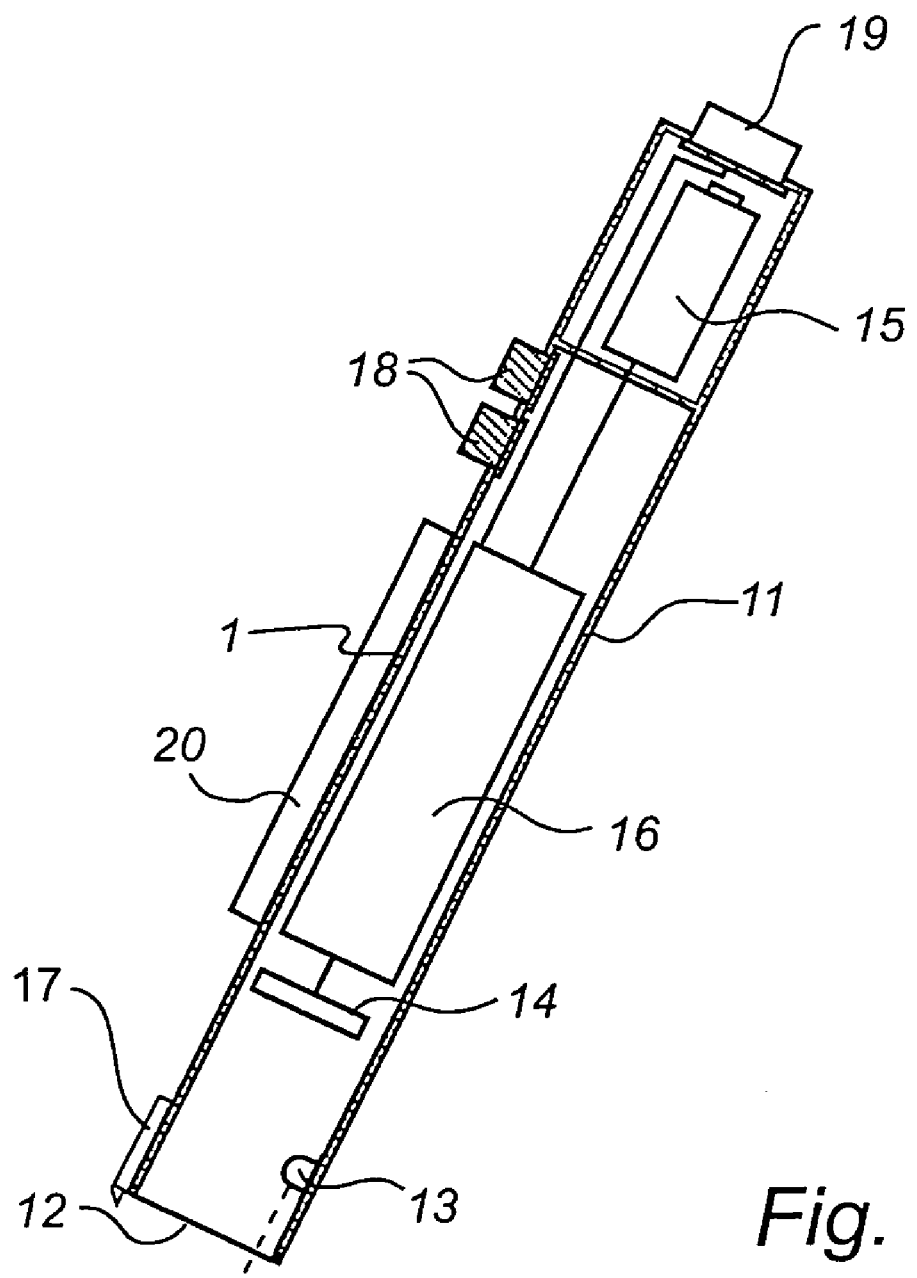
FIG. 5 shows an embodiment of a device according to the invention.

With reference to FIG. 5, a hand-held device that can be used in the system according to the invention will now be described.

The device comprises a casing 11 which is approximately the same shape as a pen. In a short side of the casing there is an opening 12. The short end is intended to be held in contact with or a short distance from the surface from which the position-coding pattern is to be read off.

The casing contains essentially an optics part, an electronic circuitry part and a power supply.

The optics part comprises at least one light-emitting diode 13 for illuminating the surface which is to be imaged and a light-sensitive area sensor 14, for example a CCD or CMOS sensor, for recording a two-dimensional image. The device may also contain an optical system, such as a reflector and/or lens system. The light-emitting diode can be an infrared light-emitting diode and the sensor can be sensitive to infrared light.

The power supply for the device is obtained from a battery 15 which is mounted in a separate compartment in the casing.

The electronic circuitry part comprises a signal processing means 16 for determining one or more positions, or more specifically coordinates for the one or more positions, on the basis of the images of the position-coding pattern recorded by the sensor 14. The signal processing means can be a processor unit with a microprocessor which is programmed to read in images from the sensor and to determine positions on the basis of these images. It can also be an ASIC or an FPGA. The microprocessor can also be programmed to recognize predefined coordinates or coordinates within predefined coordinate areas and to carry out certain operations in response to the recognition of these coordinates or coordinate areas. One operation could be to send the coordinates to a pre-determined computer, such as the first computer in FIG. 1, in order to obtain an address to a party which is the owner of the coordinate area to which the decoded coordinates belong and in order to obtain an indication of the operation to which the coordinates correspond.

The device also comprises in this embodiment a pen point 17, using which the user can carry out ordinary pigment-based writing. The pen point 17 is extendable and retractable so that the user can control whether or not it is to be used. In certain applications the device does not need to have any pen point at all.

The pigment-based writing is suitably of such a type that it is transparent to infrared light and the marks absorb infrared light. By using a light-emitting diode that emits infrared light and a sensor that is sensitive to infrared light, the detection of the pattern can be carried out without the above-mentioned writing interfering with the pattern.

The device also comprises buttons 18 by which it is activated and controlled. It also has a transceiver 19 for short-distance wireless transmission, for example using infrared light, radio waves or ultrasound, of information to and from the device. In particular, the device can communicate with a mobile phone for transmission of information to and from the Internet. The device can also comprise a display 20 for displaying information.

Applicant's Swedish Patent No. 9604008-4 describes a device for recording text. This device can be used for carrying out operations according to the invention if it is programmed in a suitable way. If it is to be used for pigment-based writing, it must also have a pen point.

The device can be divided between different physical casings, in which a first casing contains components that are necessary for recording images of the position-coding pattern and for transmitting these to components that are located in a second casing and that carry out the position determination on the basis of the recorded image or images.

Figure 6:
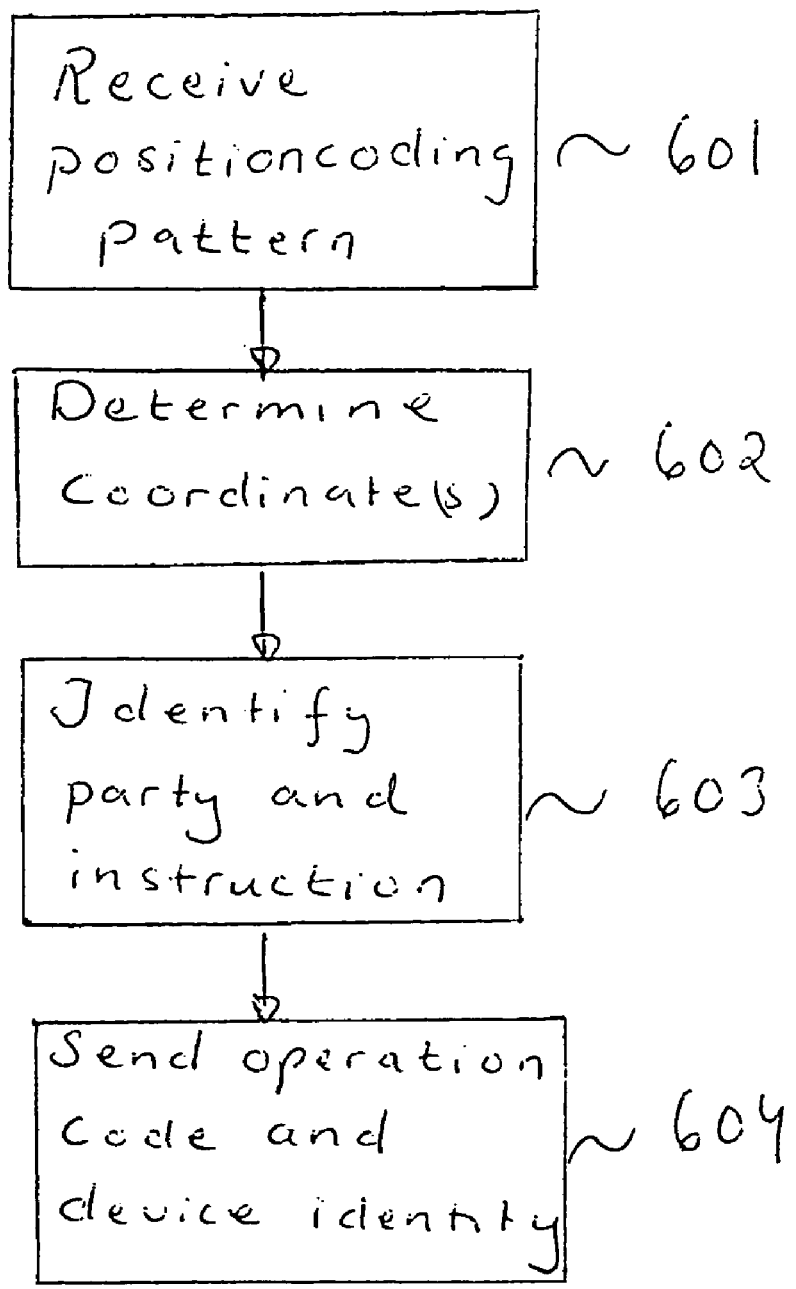
FIG. 6 shows a flow chart of an example of a method according to the invention.

The method of initiating, in a hand-held device, an operation concerning goods or services indicated on a product is summarised in the flow chart of FIG. 6.

First, in step 601, the device receives a position-coding pattern. The device decodes the position-coding pattern and determines the coordinate(s) corresponding thereto, step 602. In the next step 603, the party which is the owner of the coordinate area, to which the decode coordinate(s) belongs, is identified. At the same time the instruction given by the user of the device is identified. This instruction indicates the operation to be initiated. In response to the identification of the party and the instruction, the device sends, step 604, an operation code and a device identity to the party and possibly also to a predetermined computer, which stores a device database with the identities of all devices in the system and, associated with each identity, a person-specific piece of information, which is to be used by the party when carrying out the operation.

The invention claimed is:

1. A method in a hand-held device for initiating an operation concerning goods or services indicated on a product, comprising:
   receiving a position-coding pattern from the product;
   determining at least one absolute position by determining displacements of center of gravity of marks from nominal positions in the position coding pattern;
   identifying, on the basis of the at least one absolute position; an instruction from a person who uses the device to the effect that the operation is to be carried out using person-specific information previously stored in the system; and
   carrying out of the operation by communication with a network-based system.

2. A method of initiating a payment operation in a network-based system, by using a handheld device and a product, which is provided with human-understandable information about an item for which payment is to be carried out and at least one area comprising a position code coding absolute positions by marks that have their center of gravity displaced from respective nominal positions defined by intersections of grid lines in a regular grid, comprising:
   recording, by the handheld device, a subset of the position code coding at least one absolute position;
   determining said at least one absolute position by determining the displacements of the markings from the nominal positions in the recorded part of the position code;
   identifying, on the basis of the said at least one absolute position, that a payment operation is to be carried out; and
   identifying, on the basis of the said at least one absolute position, said item for which the payment is to be carried out.

3. The method according to claim 2, wherein the identifying that a payment operation is to be carried out is carried out in the handheld device.

4. The method according to claim 2, wherein the identifying that a payment operation is to be carried out is carried out in an external unit.

5. The method according to claim 2, further comprising sending a unique identity of the handheld device to the network-based system to enable the payment operation to be carried out.

6. The method according to claim 5, wherein the unique identity is associated with at least one account number in the networkbased system.

7. The method according to claim 2, further comprising sending an indication of an account number stored in the handheld device to the network-based system to enable the payment operation to be carried out.

8. The method according to claim 2, further comprising identifying, on the basis of said at least one absolute position, a payment recipient.

9. The method according to claim 2, further comprising recording graphical information specifying the payment operation by means of the position code and sending the graphical information from the handheld device to the network-based system to enable the payment operation to be carried out.

10. The method according to claim 2, wherein the product comprises at least two different payment areas which are provided with the position code, said payment areas representing alternative parameters of the payment operation, and said recording being carried out from a selected one of the payment areas.

11. The method according to claim 2, further comprising sending absolute positions decoded from the position code on the product to the network-based system to enable the payment operation to be carried out.

12. The method according to claim 2, wherein the recording is carried out by ticking said at least one area.

13. A server for processing a payment operation in a network-based system, initiated by a handheld device and a product, which is provided with human-understandable information about an item for which payment is to be carried out and at least one area comprising a position code coding absolute positions, the server comprising:
   a processor; and
   memory, functionally coupled to the processor, containing executable instructions for receiving, from the handheld device, at least one absolute position on the basis of marks included in a subset of the position code recorded by the handheld device, wherein the at least one absolute position is based upon displacements of center of gravity of the marks from nominal positions in the position code,
   establishing, on the basis of the said at least one absolute position, that a payment operation is to be carried out, and
   identifying, on the basis of the said at least one absolute position, said item for which the payment is to be carried out.

* * * * *